United States Patent
Barger et al.

Patent Number: 6,058,141
Date of Patent: May 2, 2000

[54] VARIED FRAME RATE VIDEO

[75] Inventors: John Barger, Salem; Shawn Cooney, Marblehead, both of Mass.

[73] Assignee: Digital Bitcasting Corporation, Salem, Mass.

[21] Appl. No.: 08/723,319

[22] Filed: Sep. 28, 1996

Related U.S. Application Data

[60] Provisional application No. 60/004,437, Sep. 28, 1995.

[51] Int. Cl.[7] .................................................. H04N 7/12
[52] U.S. Cl. .......................... 375/240; 395/200; 364/715; 364/514; 341/50; 341/61; 341/141; 341/155
[58] Field of Search .................................... 348/423, 439, 348/440, 448, 484, 443, 462, 458, 459, 461, 845.1–845.3, 464, 500, 512, 515; 386/98, 101, 104, 105, 106, 111

[56] References Cited

U.S. PATENT DOCUMENTS

| | | | |
|---|---|---|---|
| 5,247,300 | 9/1993 | Sohn | 386/98 |
| 5,359,464 | 10/1994 | Wilkinson | 386/104 |
| 5,430,485 | 7/1995 | Lankford et al. | 348/423 |
| 5,617,145 | 4/1997 | Huang et al. | 348/423 |
| 5,619,197 | 4/1997 | Nakamura | 348/423 |
| 5,784,572 | 7/1998 | Rostoker et al. | 348/423 |

OTHER PUBLICATIONS

ISO/IEC 11172 Information technology coding of moving pictures and associated audio for digital storage media at up to about 1.5 Mbit/s, Copyright 1993.

*Primary Examiner*—Christopher S. Kelley
*Assistant Examiner*—Shawn S. An
*Attorney, Agent, or Firm*—Testa Hurwitz & Thibeault, LLP

[57] ABSTRACT

A method and apparatus wherein raw video and audio are captured and digitized and stored at a frame rate different from the playback stand frame rate. The audio and the video are separated, the video as a frame and the audio as a data stream wherein there are time links to the video frame. The playback entails multiplexing the video and the audio, and where the multiplexer is operating at the standard frame rate synchronization is not maintained. The present invention discloses modifications of the audio header and/or data to accommodate the differences in the multiplexing frame rate and the original capture frame rate. If the originating frame rate is one half the standard then the audio header information is changed to indicate that twice as much audio information exists, whereupon the multiplexer will take the video frames and properly multiplex the proper and therefore synchronized audio data. For example, the existence of 150 video frames originally taken at 15 fps or 10 seconds worth of video, causes the multiplexer and the associated software to presume that the 150 frames were taken at 30 frames per second and the 5 seconds worth of audio was required. The header is changed to indicate there is half as much audio or five seconds worth, which is the correct value. The resulting multiplexing of video and audio is in synchronization.

13 Claims, 10 Drawing Sheets

HEADER #1 (UNMODIFIED)

HEADER FROM A 11.025KHZ 8BIT MONO WAV AUDIO FILE 52 49 46 46 7C 58 0A 00 57 41 56 45 66 6D 74 20 10 00 00 00 01 00 01 00 11 2B 00 00 11 2B 00
00 01 00 08 00 64 61 74 61 58 58 0A 00 7F 7F 7F 7F 7F 7F 7F 7F 7F 7F 7F 7F 7F 7F 7F 7F 7F 7F
7F 7F 7F 7F 7F 7F 7F 7F 7F 7F 7F 7F 7F 7F 7F 7F 7F 7F 7F 7F 7F 7F 7F 7F 7F 7F 7F 7F 7F 7F
7F 7F 7F 7F 7F

FIG. 8A

HEADER #2 (LOW SAMPLE RATE)

HEADER FROM A 11.025KHZ 8BIT MONO WAV AUDIO FILE
USE METHOD #1 TO DOUBLE THE VALUES OF THE
SAMPLE RATE AND AVERAGE BYTES PER SECOND 52 49 46 46 7C 58 0A 00 57 41 56 45 66 6D 74 20 10 00 00 00 01 00 01 00 22 56 00 00 22 56 00
00 01 00 08 00 64 61 74 61 58 58 0A 00 7F 7F 7F 7F 7F 7F 7F 7F 7F 7F 7F 7F 7F 7F 7F 7F 7F 7F
7F 7F 7F 7F 7F 7F 7F 7F 7F 7F 7F 7F 7F 7F 7F 7F 7F 7F 7F 7F 7F 7F 7F 7F 7F 7F 7F 7F 7F 7F
7F 7F 7F 7F 7F

FIG. 8B

HEADER #3 (VERY LOW SAMPLE RATE)

HEADER FROM A 11.025KHZ 8BIT MONO WAV AUDIO FILE
USE METHOD #1 TO QUADRUPLE THE VALUES OF THE
SAMPLE RATE AND AVERAGE BYTES PER SECOND 52 49 46 46 7C 58 0A 00 57 41 56 45 66 6D 74 20 10 00 00 00 01 00 01 00 44 AC 00 00 44 AC 00
00 01 00 08 00 64 61 74 61 58 58 0A 00 7F 7F 7F 7F 7F 7F 7F 7F 7F 7F 7F 7F 7F 7F 7F 7F 7F 7F
7F 7F 7F 7F 7F 7F 7F 7F 7F 7F 7F 7F 7F 7F 7F 7F 7F 7F 7F 7F 7F 7F 7F 7F 7F 7F 7F 7F 7F 7F
7F 7F 7F 7F 7F

VARIED FRAME RATE VIDEO

This application claims priority under 35 U.S.C.§119(e) and/or §120 from Provisional Application No. 60/004-437 filed Sep. 28, 1995, by the same inventors.

FIELD OF THE INVENTION

The present invention relates generally to handling video in the digital communications and computer technology. In particular the present invention relates to recording and encoding of moving pictures and associated audio for digital storage, transmission and playing, and more particularly to synchronization when the frame timing rates change between recording and playing.

BACKGROUND OF THE INVENTION

There are three major digital video standards, Apple's Quicktime, Microsoft's Video for Windows, and the MPEG families. MPEG-1 promises to be accepted as a cross platform solution for handling video.

Both Quicktime and Video for Windows allow varied frame rates, but with the disadvantage of large file sizes despite data compression, and relatively poor picture quality and poor audio/picture synchronization. MPEG has smaller file sizes and better image quality but at a frame rate fixed between 24 and 30 frames per second (fps). A frame of video data contains the data necessary to display a full screen view of the one (still) picture which together with the other frames when played sequentially forms a moving picture.

Both Quicktime and Video for Windows store a data compressed video image (but still quite large) and linked audio file. Both the video and the audio portions are time stamped within the files, but this, by its nature, includes slight inaccuracies and the audio and the video may not be completely synchronized.

MPEG-1 was developed by the Motion Picture Experts Group, a consortium of Multimedia companies, to maximize an efficient platform for an independent video solution. MPEG-1 is a comparative frame compression system wherein once every 5th to 15th frame an actual image (I) frame exists. Between the I frames are bi-directional (B) and predictive (P) frames. The B frame contains the differences between the frame before the B frame and after the B frame. An P frame has an algorithm that a computer uses to approximate the frame. Two multiple sequences are typically used in the art: (i) a sequence of I BBBP BBBP BBBP (repeated), and (ii) I BBP BBP BBP BBP BBP (repeated). Since most of the frames contain only partial image information and there is actually little change between frames, the file sizes are much smaller than in Quicktime and Video for Windows. The audio in MPEG-1 is broken up into individual segments as well. There are the same number of audio packets as there are video frames. This allows the decoder to know which audio packet to play with each video frame thereby allowing an improved synchronization of audio to video over Quicktime and Video for Windows.

MPEG-1 was designed for frame rates of 24, 30 and higher. One limitation of MPEG-1 is that special hardware must be used to playback the audio and video files at full speed and performance. This special hardware, is expensive. When MPEG-1 is played in a personal computer (PC), without the special hardware many frames are skipped causing a jerky playback. There is a need to provide varied frame rate playback using existing distribution channels and playback solution. Creating an MPEG-1 at 15 fps approximately halves the size of the files without significant reduction in playback quality for existing systems without the aforementioned special hardware.

Many or most users on the internet have relatively slow modem connections to the internet, and therefore these systems are slow in downloading almost any significantly sized file. Also, real-time audio/video playing while downloading requires lower data and frame rates due to the existing telecommunications equipment available to most users on the internet. The games market using Quicktime or Video for Windows requires 3 or 4 CD-ROM disks, MPEG-1 will reduce this to 1 or 2 disks. These factors suggest that there is a limitation of the present systems and a need for a lower frame rate video with accurately synchronized audio.

However, if a video source is captured and digitized at 15 fps and the audio is simultaneously captured and digitized at the standard sampling rates of from 11.025 kHz to 44.1 kHz, then combining the video and audio files in the normal MPEG-1 multiplexing will create a problem. MPEG-1 encoding software assumes that the frame rates are 30 fps. So if there are 150 frames of video data taken at 15 fps, or ten seconds worth of video, the software looks for 5 seconds worth of audio to combine with the 150 frames. Obviously no matter how played the multiplexed files will not play properly for there is actually ten seconds of video and five seconds (the first five seconds) of matching audio. This limitation is the subject of the present invention.

It is an object of the present invention to provide apparatus and method to record a video and associated synchronized audio via a varied frame rate technique, and where playback utilizes standard software and hardware, where said standard hardware and software operates at a fixed frame rate that is different from the particular (variable) frame rate of the recording, such that the resulting video and audio are synchronized.

It is an object of the present invention to provide a varied frame rate with MPEG-1 picture quality and synchronized audio.

Yet another object of the present invention is to provide a lower frame rate video with accurately synchronized audio.

It is another object of the present invention to provide a smaller audio portion and/or video portion of the file.

SUMMARY OF THE INVENTION

The foregoing objects are met in a system that provides for the varied frame rates while using the unmodified multiplexing and playback software associated with a standard method and hardware of playing video. Video and associated audio are stored digitally in different files with links and time stamps. These files are multiplexed together during playback, wherein the multiplexing preserves the synchronization of the video and the audio. Such a method of multiplexing a stored digital video file and a stored digital audio file, where the stored video and audio files are recorded and digitized at a first frame rate, FR1, but where the multiplexing assumes a second, higher frame rate, FR2, and where the multiplexing preserves the video and audio synchronization, is accomplished including the steps of: storing the digital audio file with first control bits associated with the audio file which signify the average bytes-per-second and/or sampling rate, the first control bits having a value indicating a digitization process consistent and compliant with FR2, multiplying the value of the first control bits by FR2/FR1 forming second control bits, replacing the first control by the second control bits, notifying the multiplexing and where the audio control bits are located, and multiplexing the stored digital video file and the stored digital audio file containing the second control bits. In this way the multiplexer "thinks", say in the 30/15 instance, that there is half audio as actually exists. The multiplexing hardware will assume that the video exists at 30 frames per second, and will take the corresponding time amount of audio to perform the synchronization. Since the video was only half what the multiplexing software "thought" (since it was at 15 fps rather than 30 fps) only half of the audio file (which has been multiplied by 2) is taken to correspond to the video—and now it does correspond and therefore is synchronized. Again the standard multiplexing is used and there is only the program to accomplish the changes necessary for the "deceiving" the standard software. Of course, the standard software could all be modified, but an advantage of this invention, in a preferred embodiment, is to utilize the commonly found hardware and software to save storage space, bandwidth or time, without changing the world.

Another method replaces the audio data by a reduced version where the reduction is a direct function of the higher frame rate divided by the lower frame rate. That is if the standard multiplexing assumes 30 fps and the video/audio is generated at 15 fps then 30/15 equals two, and half of the audio data is discarded. The ratio was 30/7.5 or four, and three fourths of the audio data is discarded.

These two above methods allow the video file and the audio file to be multiplexed together preserving the synchronization while allowing the standard multiplexing software, say of MPEG-1, to be used but with a reduced storage need and/or communication time and/or bandwidth. In a preferred embodiment the standard video/audio handling is via the MPEG-1 standard.

The present invention can be applied to real-time on-the-fly playing of the video/audio files as they are communicated to the viewers system. In the MPEG standard the header information contains the bytes per second information before the actual data bytes, so the control information appears first. The above modification of the control bits can be done in real-time and the appropriate audio data bits discarded in both of the above techniques.

Other objects, features and advantages will be apparent from the following detailed description of preferred embodiments thereof taken in conjunction with the accompanying drawings in which:

BRIEF DESCRIPTION OF THE DRAWINGS

FIGS. 6, 7, 8A–C, 9, and 10 are visual representations of the various low sampling rate MPEG-1 audio files.

DETAILED DESCRIPTION OF PREFERRED EMBODIMENTS

The preferred embodiments of the present invention are built around the MPEG protocols, especially the MPEG-1 protocol. However, other variable frame rate protocols can be used to advantage with the present invention.

Figure 1:
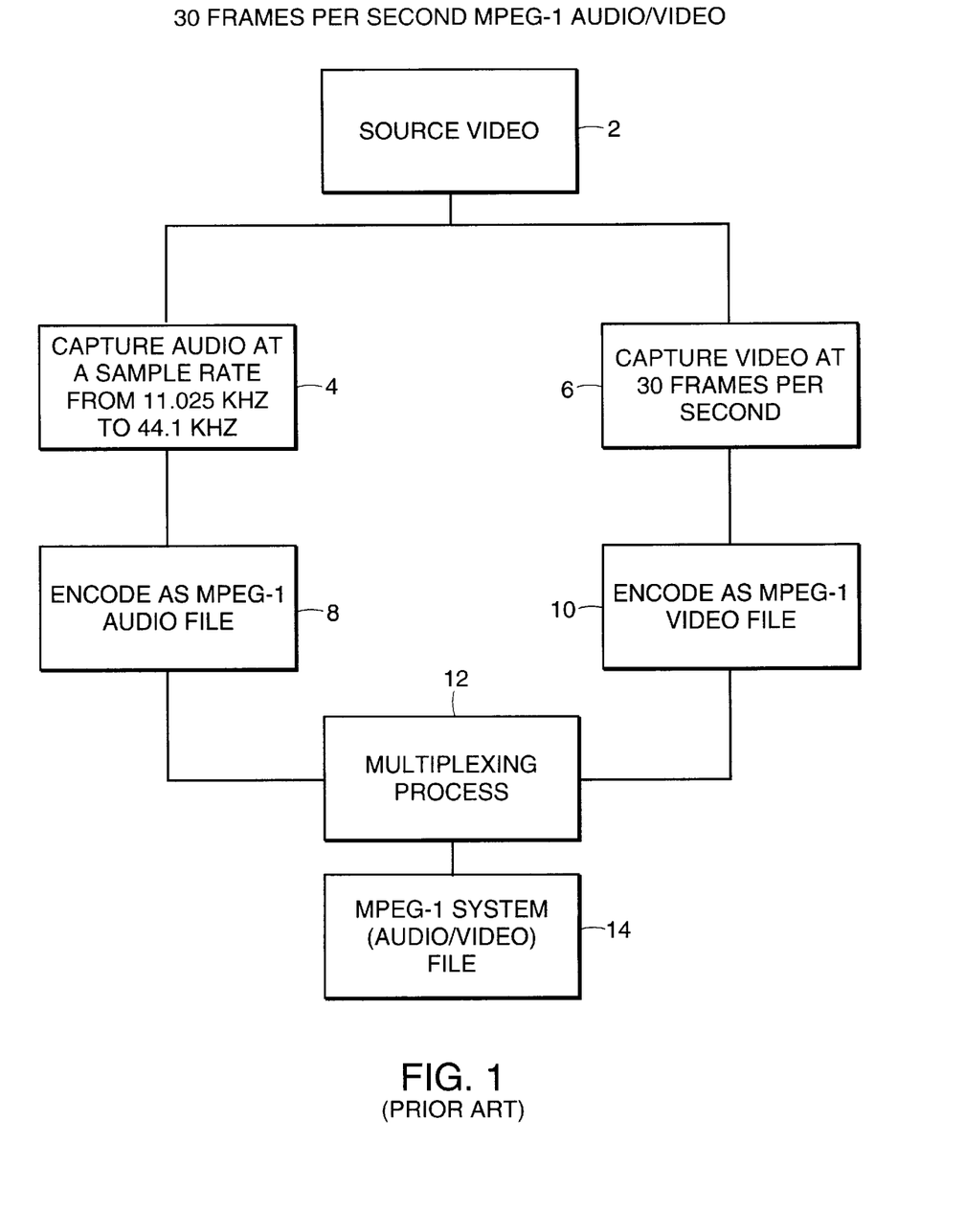
FIG. 1 is a prior art flow chart for creating a MPEG-1 audio/video files.

FIG. 1 shows a standard implementation of a 30 fps source 2 of video and audio which is broken into separate audio 4 and video 6 files. These are digital files of the video frame digital data and the audio digital data. The raw or initial video and audio analog signals are input from any audio/video source, including other MPEG or JPEG or other such stored files, VCRS, cameras, microphones, or the like. The analog signal are digitized via analog to digital converters and stored in known computer memories, e.g. RAM, EROM, disks,mag tapes, etc. The hardware and the software to generate these digital files and process these analog signals and the resulting digital signals and/or stored data files are known in the art. As discussed below, the audio is digitized at sample rates of 11.025 kHz to 44.1 kHz. The files are encoded as MPEG-1 audio 8 and video 10 files. These files have header and other control information embedded in the files as discussed below. The audio and video files are multiplexed 12 together for playback to generate a composite MPEG-1 audio/video 14 file.

Figure 2:
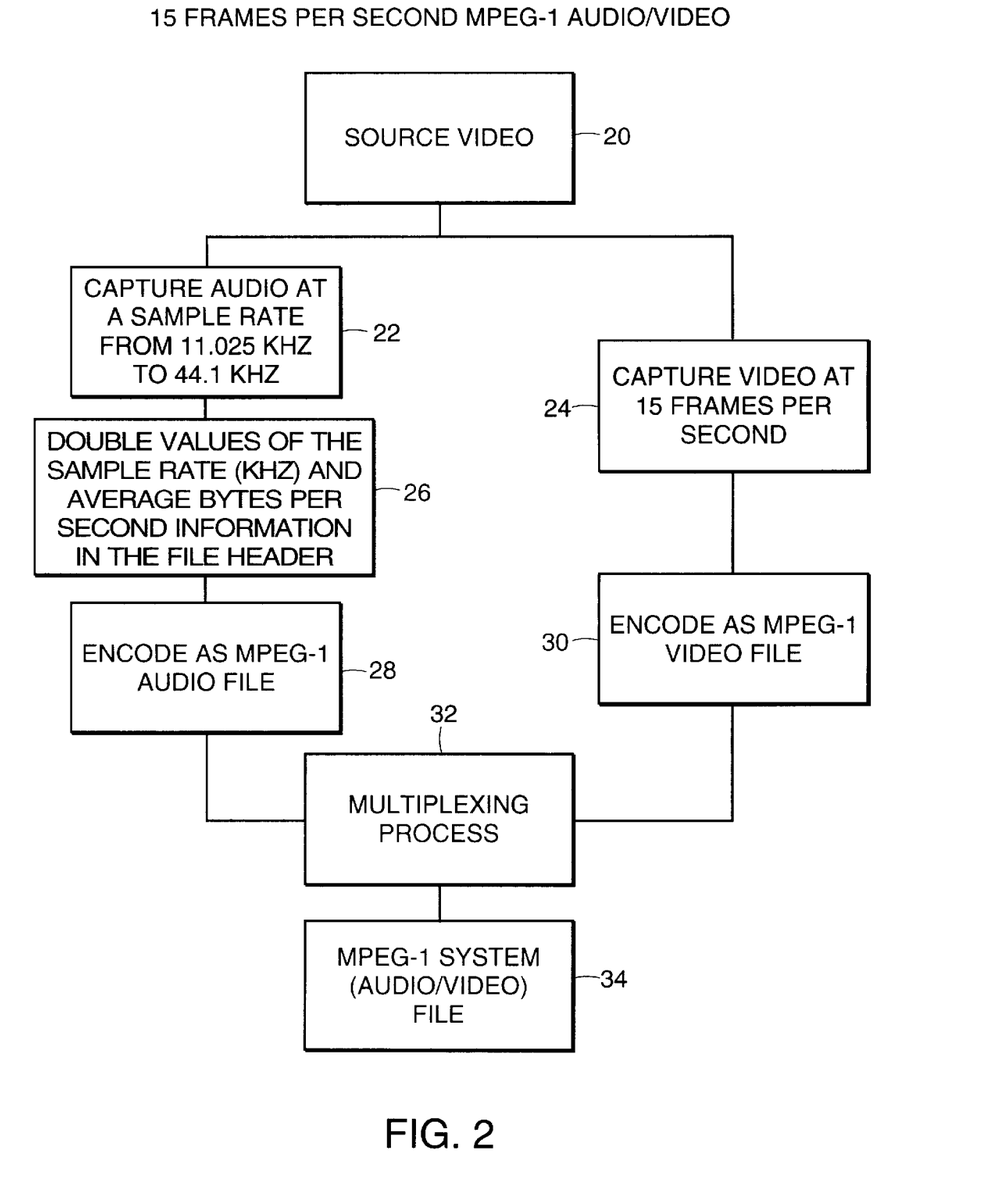
FIGS. 2 and 4 are flow charts for creating 15 fps MPEG-1 audio/video files.

FIG. 2 show the steps to implement a first method of capturing the raw video/audio at a different frame rate, in this instance 15 fps. The audio 22 is sampled at rate as in the prior art, and the video frame data is as in the prior art but there is only fifteen frame per second. In this flow chart the audio file is changed to such that double the actual values of the sample rate and double the actual average bytes per second are placed in the control bit header information of the audio file 26. This modified file is encoded and held as a standard MPEG-1 audio file 28. The video is encoded a standard MPEG-1 video file 30. The multiplexing 32 operation operates on the audio and the video files in the normal fashion creating a what the multiplexer "believes" to be a standard MPEG-1 audio/video file 34.

Figure 3:
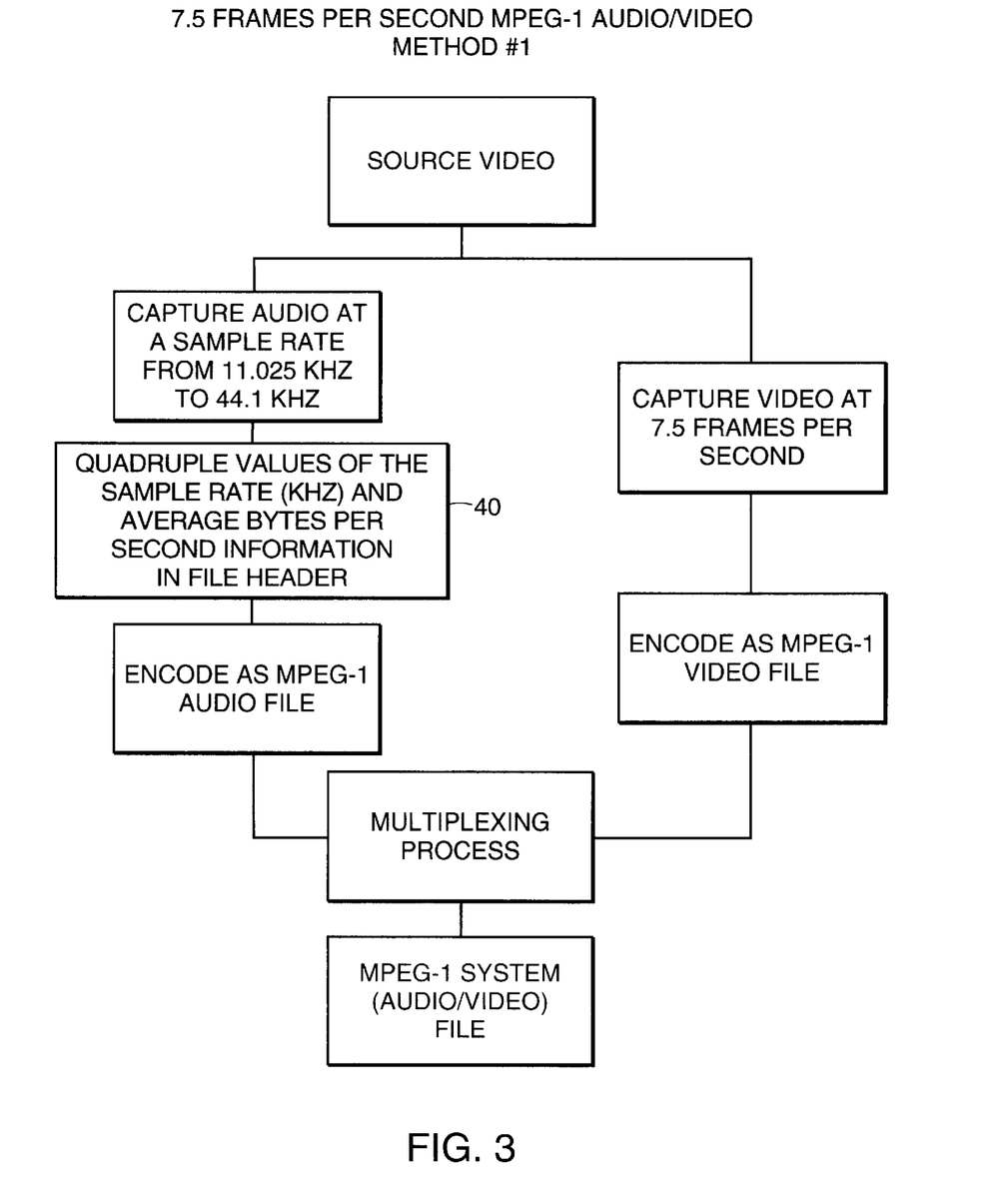
FIGS. 3 and 5 are flow charts for creating 7.5 fps MPEG-1 audio/video files

FIG. 3 is the equivalent flow chart to FIG. 2 where the capture rate is 7.5 fps, or one fourth, of 30 fps,one of the standard MPEG-1 frame rates. Here, in block 40 the audio values are quadrupled or multiplied by four.

Figure 4:
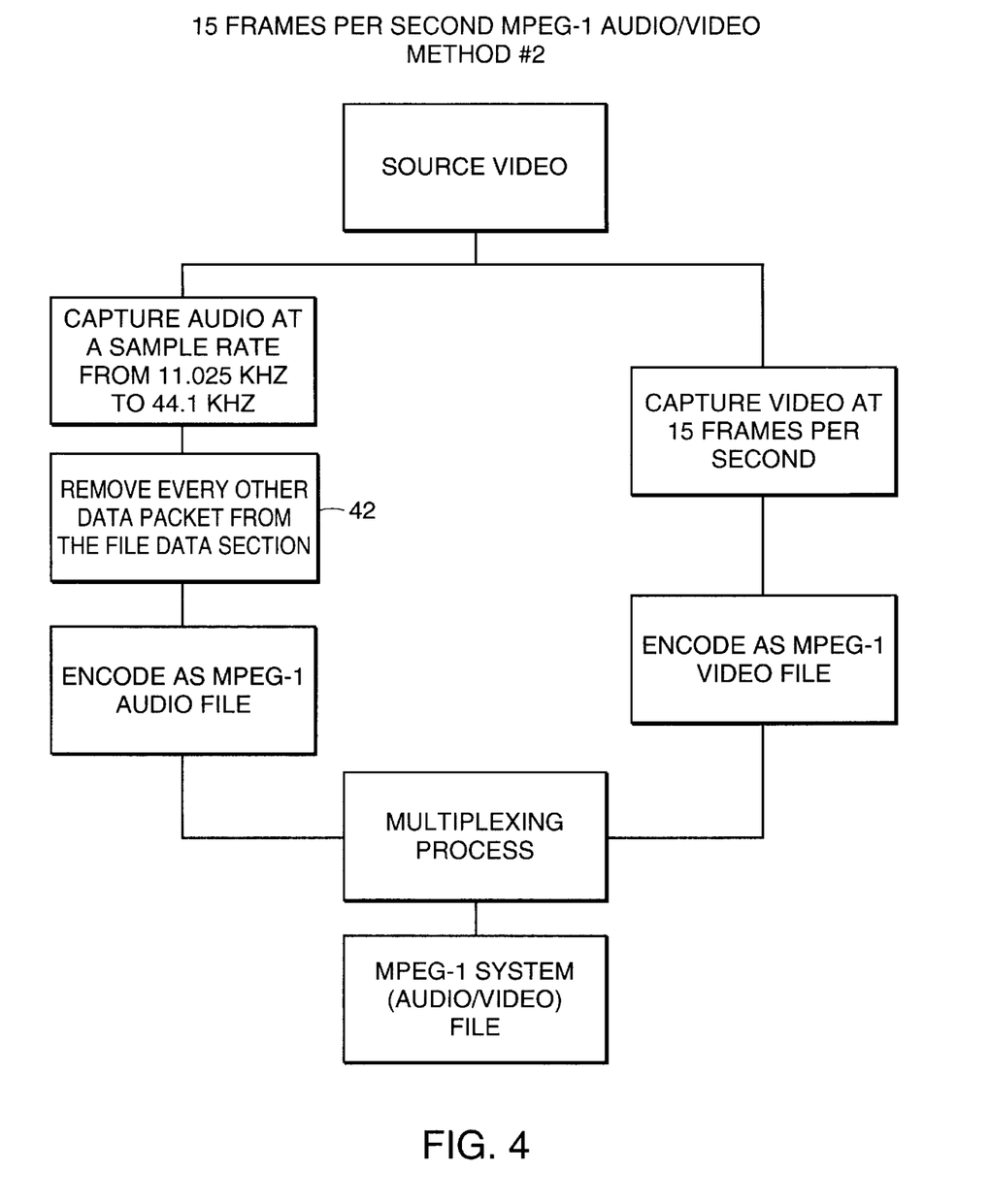

FIG. 4 is a different method for implementing a varied MPEG-1 frame rate wherein the audio remains synchronized to the video. In this case at block 42 every other audio value is removed. There audio file is half the original length to accommodate a 15 fps original capture sampling rate while using a multiplexer that operates at 30 fps.

Figure 5:
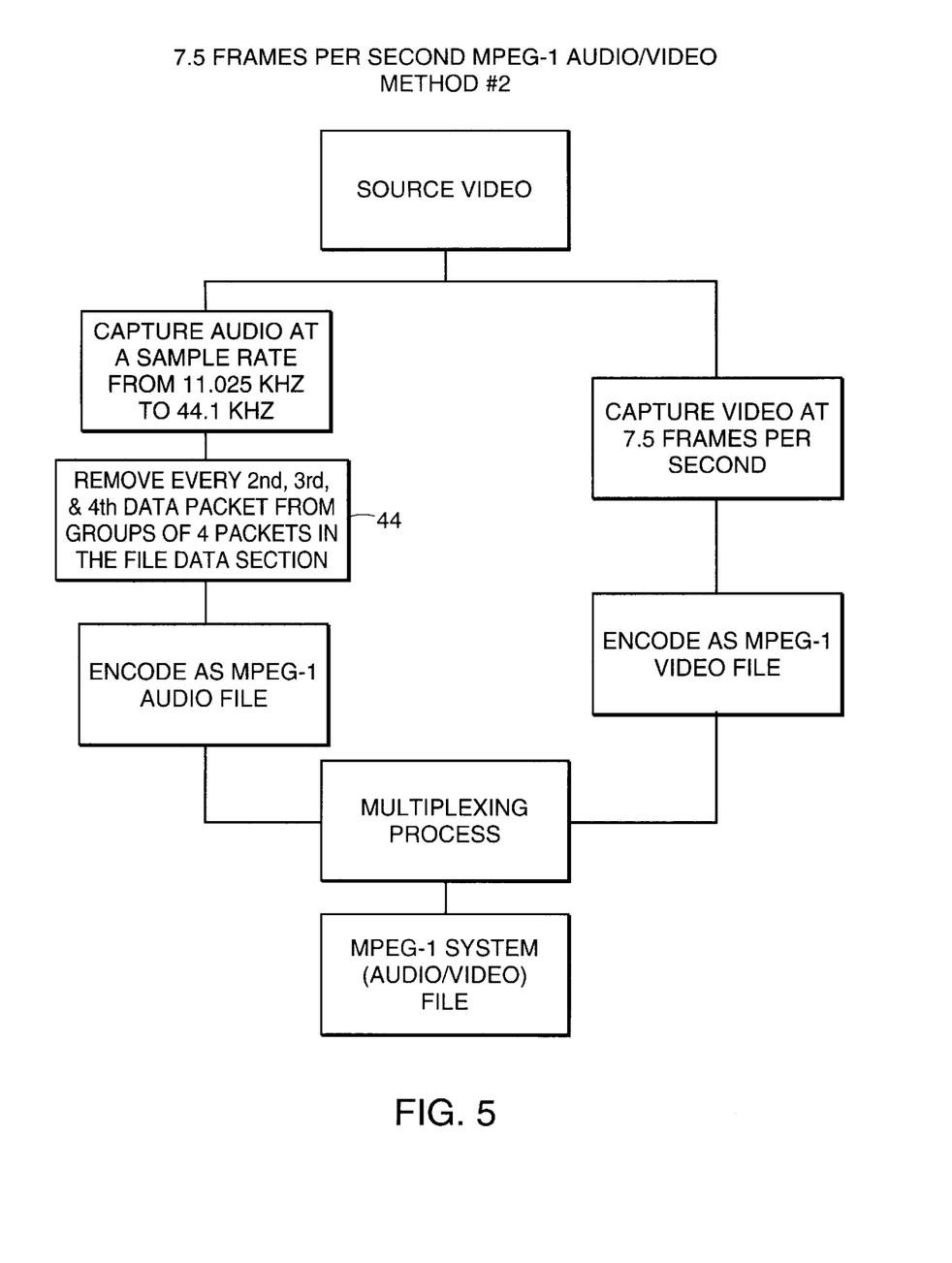

FIG. 5 shows the equivalent where the original capture frame rate is 7.5 fps. Here the second, third and fourth data packet of the audio are deleted 44 before forming and encoding an MPEG-1 audio file.

Figure 6:
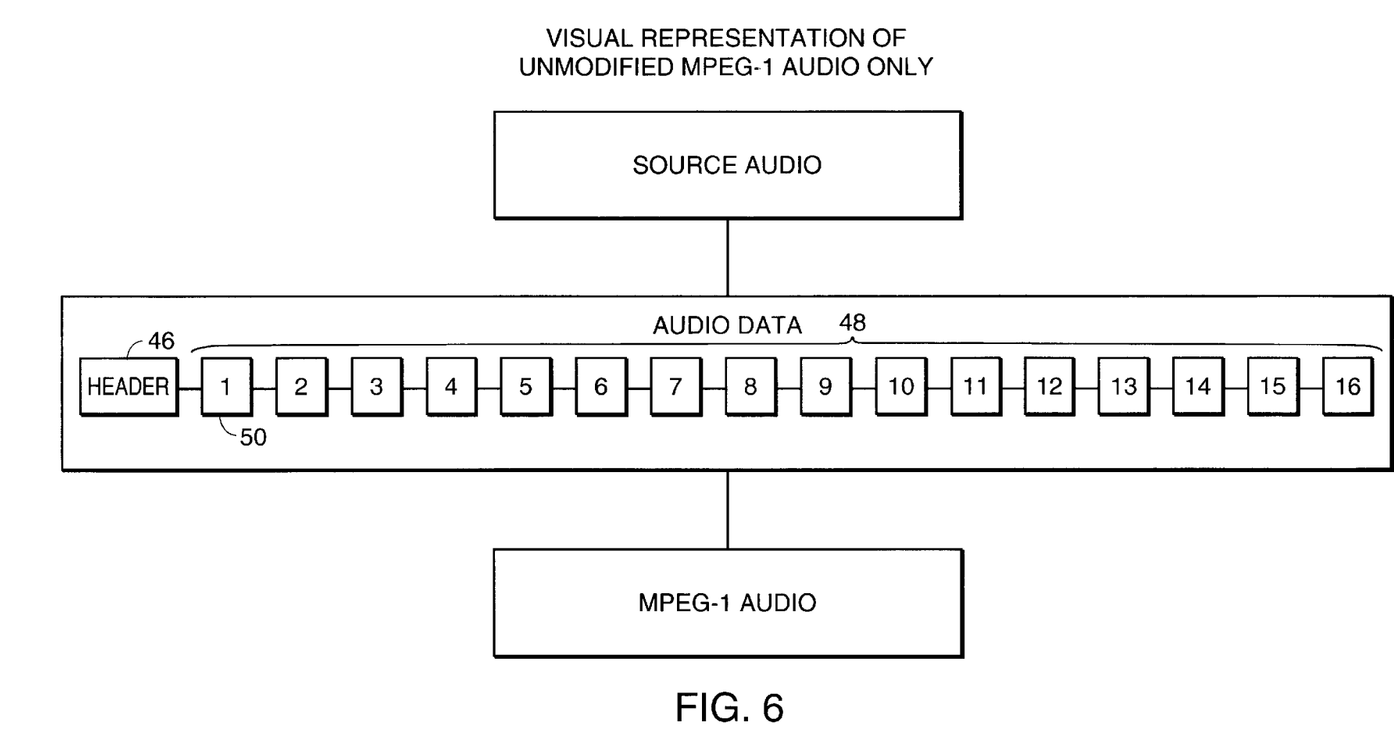

FIG. 6 shows the a graphical/pictorial view of an unmodified MPEG-1 audio file. There header information 46 is presented before the digitized data 48. The time sequence of the stored audio begins at the packet labeled 150.

Figure 7:
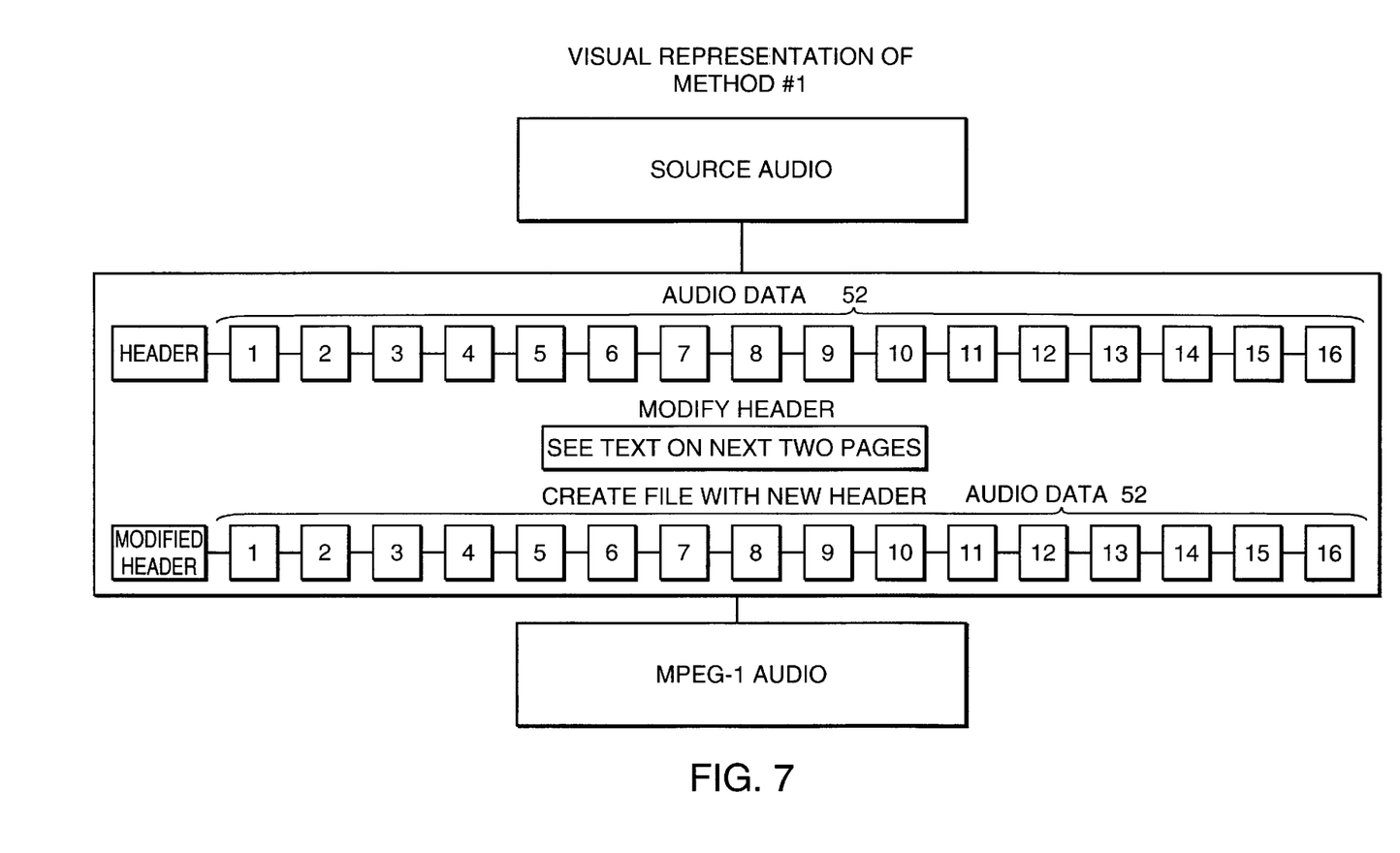

FIG. 7 shows the modification of the audio data file under one preferred embodiment of the digitized audio file. The data packets 52 remain intact. The header is modified, as discussed below in detail, to change by doubling or quadrupling the Sample rate and the Average Byte Per Second values inherent in the MPEG-1 protocol. Doubling applies to 15 fps and quadrupling applies to 7.5 fps capture frame rates using a 30 fps multiplexer. The values may be changed using any number of methods, e.g. Norton's DiskEdit, a popular file editor, to manually change the header information, or by writing a program to change the header information, or by modifying the audio capture utility program to change the header information as the original file is created. Hardware and software to accomplish such changes are known in the art.

In MPEG-1 protocol, the Sample Rate and the Average Byte Per Second may have different values depending upon the audio. The digitizing may be using 8 bits, 16 bits, and monophonic or stereophonic audio may be stored in the file.

For example, with an audio input sampled at 11.025 kHz with 8 bits, and monophonic the Sample Rate and the Average Byte Per second will have the same value. However, with 16 bit mono the Average Byte Per Second value will be twice that of the Sample Rate. There will be the same difference for 8 bit stereophonic. For 16 bit stereophonic the difference will be four times higher. Referring back to FIG. 7 the header information will reflect these differences FIG. 8A shows the specific hexadecimal values for the first 100 bytes of a Microsoft WAV file. The underlined, bolded bytes are the actual Sample Rate (the first set of two bytes underlined and bolded) and the Average Byte Per Second from the headers of several audio files taken as noted. The 112B is the hex equivalent of the decimal number 11025, which is one of the rates for sampling and audio signal. Similarly, 2256 is the hex equivalent for 22050 and 44AC is the equivalent for 44100. FIG. 8A shows the unmodified WAV file. FIG. 8B shows the WAV file modified as in the present invention by doubling the Sample Rate and the Average Byte Per Second values. This doubling occurs when the standard fps is 30 fps and the video is captured at 15 fps. FIG. 8C shows these same values quadrupled which is needed with a 7.5 fps capture.

Figure 9:
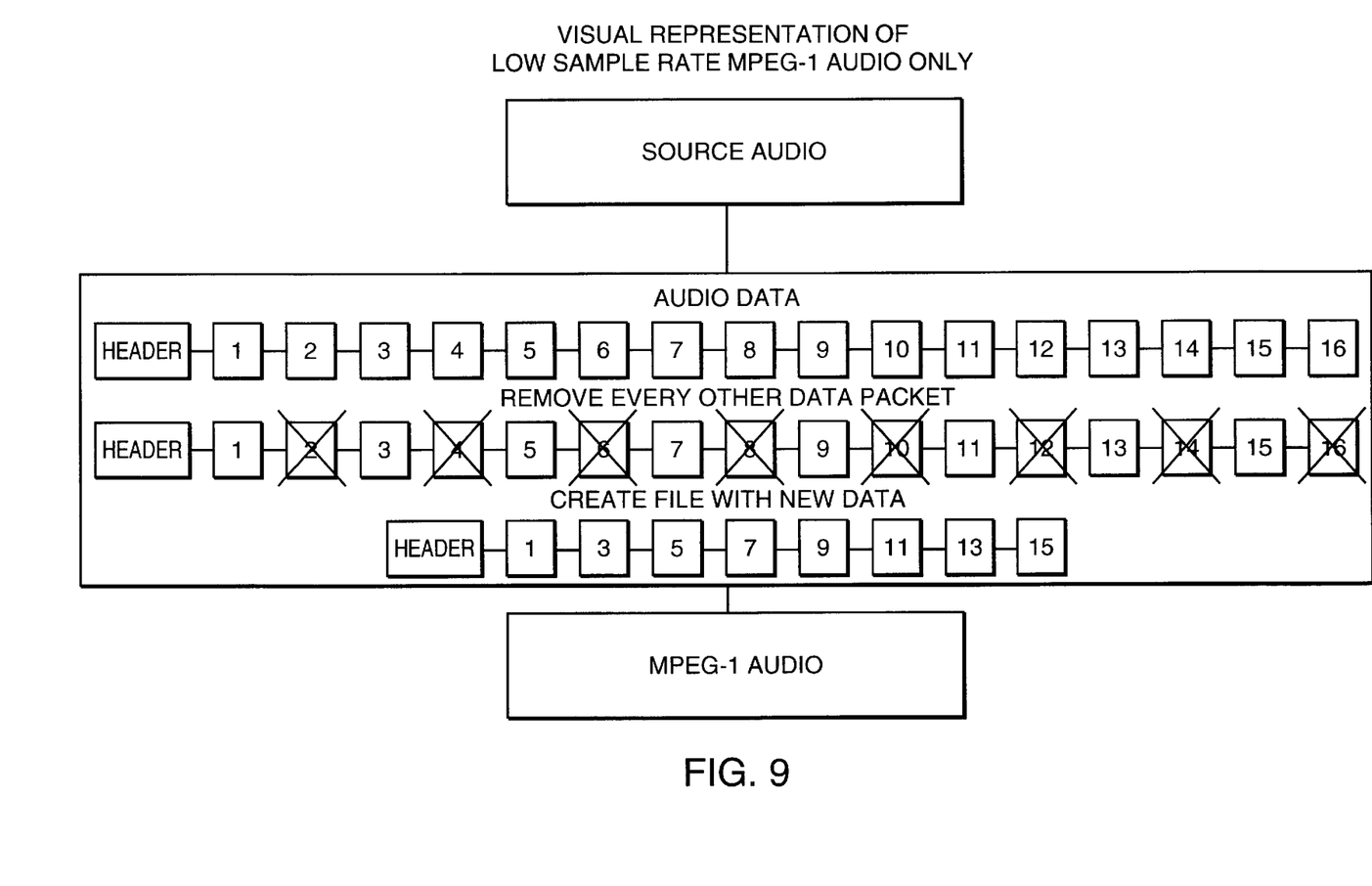

FIG. 9 shows the another preferred embodiment for synchronizing the audio file to the video by deleting audio data values while leaving the header information intact. FIG. 9 shows the deletion of every other data value for synchronizing a 15 fps to a 30 fps system, or a 12 fps to a 24 fps system.

Figure 10:
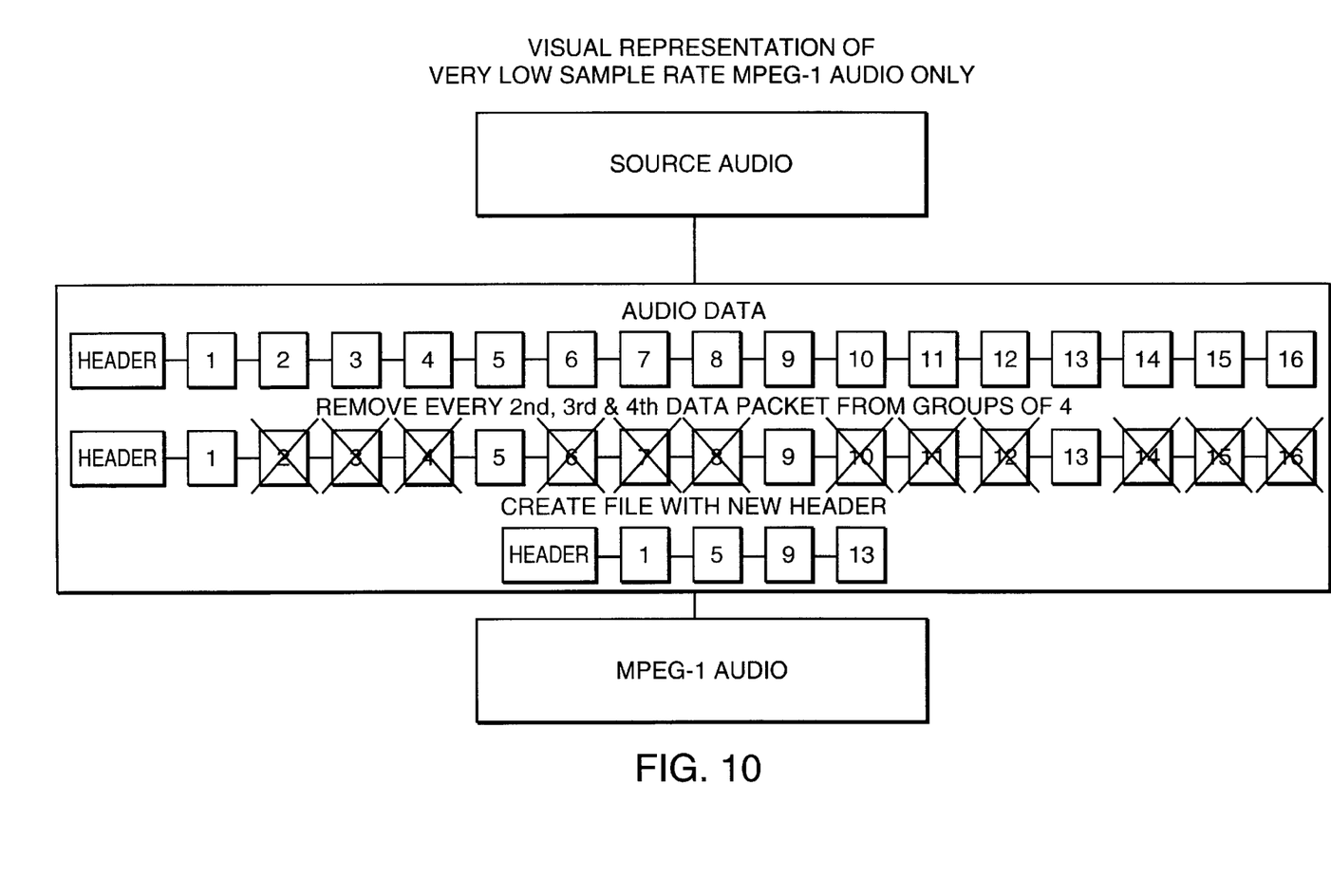

FIG. 10 shows the deletion of three out of four data packets needed to synchronize a 7.5 fps to a 30 fps system, or a 6 fps to a 24 fps system.

It should be noted that the same techniques herein described apply to any standard frames per second rate where the initial capture is at any fraction, especially an evenly divided fraction, of the standard frame rate. For example, if the standard MPEG-1 frame rate is 24 fps, the present invention and techniques, in preferred embodiments, apply to 12 and 6 fps rates (yielding fractions of ½ and ¼). In addition, any other even fraction of 24, say, 3 (⅛) or 2 (1/12) will find advantage using the present invention. Rates that are not evenly divided, for example using the 24 as the MPEG-1 standard frame rate, an original frame rate of 8 or 16 fps, which when divided by 24 yields ⅓ and ⅔, respectively, may find advantage with the present invention.

Another related technique is to modify the audio files in the opposite direction. In all of the above representations, the original capture rates for the raw video/audio signals are taken at fewer frames per second than the standard, the MPEG-1 standard, in a preferred embodiment. However, the same invention can be used where the original capture is done at a rate higher than the standard. Say the capture was at 60 fps, in this case the audio header or the actual information could be modified to match the 60 fps video using the MPEG-1 multiplexer in a manner described above.

As mentioned before other standard video techniques besides the MPEG formats may find the present invention useful.

MPEG-1 is a preferred embodiment. The following description discusses of the MPEG-1 standard specification, format, protocol, data structures, processes, etc. This description is also referenced in the Information Disclosure Statement.

MPEG-1 Specification Summary:

The MPEG-1 specification (official title: ISO/IEC 11172 Information technology Coding of moving pictures and associated audio for digital storage media at up to about 1.5 Mbit/s, Copyright 1993.) consists of five parts. Each document is a part of the ISO/IEC number 11172. The first three parts reached International Standard in 1993. Part 4 reached IS in 1994. In mid 1995, Part 5 will go IS.

Part 1—Systems: The first part of the MPEG standard has two primary purposes: 1). a syntax for transporting packets of audio and video bitstreams over digital channels and storage mediums (DSM), 2). a syntax for synchronizing video and audio streams.

Part 2—Video: describes syntax (header and bitstream elements) and semantics (algorithms telling what to do with the bits). Video breaks the image sequence into a series of nested layers, each containing a finer granularity of sample clusters (sequence, picture, slice, macroblock, the image sequence into a series of nested layers, each containing a finer granularity of sample clusters (sequence, picture, slice, macroblock, block, sample/coefficient). At each layer, algorithms are made available which can be used in combination to achieve efficient compression. The syntax also provides a number of different means for assisting decoders in synchronization, random access, buffer regulation, and error recovery. The highest layer, sequence, defines the frame rate and picture pixel dimensions for the encoded image sequence.

Part 3—Audio: describes syntax and semantics for three classes of compression methods. Known as Layers I, II, and III, the classes trade increased syntax and coding complexity for improved coding efficiency at lower bit rates. The Layer II is the industrial favorite, applied almost exclusively in satellite broadcasting (Hughes DSS) and compact disc video (White Book). Layer I has similarities in terms of complexity, efficiency, and syntax to the Sony MiniDisc and the Philips Digital Compact Cassette (DCC). Layer III has found a home in ISDN, satellite, and Internet audio applications. The sweet spots for the three layers are 384 kbit/sec (DCC), 224 kbit/sec (CD Video, DSS), and 128 Kbits/sec (ISDN/Internet), applications. The sweet spots for the three layers are 384 kbit/sec (DCC), 224 kbit/sec (CD Video, DSS), and 128 Kbits/sec (ISDN/Internet), respectively.

Part 4—Conformance: (circa 1992) defines the meaning of MPEG conformance for all three parts (Systems, Video, and Audio), and provides two sets of test guidelines for determining compliance in bitstreams and decoders. MPEG does not directly address encoder compliance.

Part 5—Software Simulation: Contains an example ANSI C language software encoder and compliant decoder for video and audio. An example systems codec is also provided which can multiplex and demultiplex separate video and audio elementary streams contained in computer data files.

General Description:

MPEG-1 allows video to be compressed by the ratios in the range of 50:1 to MPEG-1 allows video to be compressed by the ratios in the range of 50:1 to 100:1, depending on image sequence type and desired quality The encoded data rate is targeted at 1.5 Mb/s for this is a reasonable transfer rate of a double-speed CD-ROM player (rate includes audio and video). VHS-quality playback is expected from this level of compression. The Motion Picture Expert Group (MPEG) also established the MPEG-2 standard for high-quality video playback at a higher data rates. Software-based MPEG-1 video decoding is considerably CPU-intensive. However, the performance bottleneck in current implementations is still file input, especially in the case of video playback through remote channel. Nevertheless, the performance requirement of a video decoder is still fundamentally bounded by the so-called real-time performance, which is 30 frames per second. There is no practical reason why one would desire a video decoder to run faster than real-time, except in fast-forwarding playback. In the case of fast-forwarding playback, the limited file input rate and the video output rate become the major concerns playback. In the case of fast-forwarding playback, the limited file input rate and the video output rate become the major concerns. Software-based MPEG-1 video encoding is an entirely different story. While the encoder needs a decent input rate to read in the raw and uncompressed video source, the encoding process itself is extremely CPU-intensive. In order to achieve real-time encoding (30 frames per second), several GFlops is needed. Sequential software encoders are unavoidably slow. The Berkeley MPEG Encoder can compress video at a rate of 1.2 frames per second for 352×288 (CIF) images on a Sun SPARCstation 10. Hardware encoders can encode video in real-time by using multiple custom-designed video processor chips but they are expensive. The C-Cube real-time MPEG-1 video encoder uses 8 custom-designed video processor chips. A complete system might cost $120,000. Less expensive boards are available ($4,000 for a full MPEG-1).

To obtain better software encoding performance, a cluster of workstations could be used to distribute the workload. The Berkeley Parallel MPEG Encoder can compress 4.7 frames per second on 6 Sun workstations connected could be used to distribute the workload. The Berkeley Parallel MPEG Encoder can compress 4.7 frames per second on 6 Sun workstations connected by an ethernet. MPEG-1 Video Overview. The basic idea behind MPEG video compression is to remove spatial redundancy within a video frame and temporal redundancy between video frames. As in JPEG, the standard for still image compression, DCT-based (Discrete Cosine Transform) compression is used to reduce spatial redundancy. Motion-compensation is used to exploit temporal redundancy. The images in a video stream usually do not change much within small time intervals. The idea of motion-compensation is to encode a video frame based on other video frames temporally close to it.

Video Format:

A video stream is a sequence of video frames. Each frame is a still image. A video player displays one frame after another, usually at a rate close to A video stream is a sequence of video frames. Each frame is a still image. A video player displays one frame after another, usually at a rate close to 30 frames per second (23.976, 24, 25, 29.97, 30). Frames are digitized in a standard RGB format, 24 bits per pixel (8 bits each for Red, Green, and Blue). MPEG-1 is designed to produce bit rates of 1.5 Mb/s or less, and is intended to be used with images of size 352×288 at 24–30 frames per second. This results in data rates of 55.7–69.6 Mb/s.

The MPEG-1 algorithm operates on images represented in YUV color space (Y Cr Cb). If an image is stored in RGB format, it must first be converted to YUV format. In YUV format, images are also represented in 24 bits per pixel (8 bits for the luminance information (Y) and 8 bits each for the two chrominance information (U and V)). The YUV format is subsampled. All luminance information is retained. However, chrominance information is subsampled 2:1 in both the horizontal and vertical directions. Thus, there are 2 bits each per pixel of U and V information. This subsampling does not drastically affect quality because the eye is more sensitive to luminance than to chrominance information. Subsampling is a lossy step. The 24 bits drastically affect quality because the eye is more sensitive to luminance than to chrominance information. Subsampling is a lossy step. The 24 bits RGB information is reduced to 12 bits YUV information, which automatically gives 2:1 compression. Technically speaking, MPEG-1 is 4:2:0 YCrCb.

Frame Encoding;

Frames are divided into 16×16 pixel macroblocks. Each macroblock consists of four 8×8 luminance blocks and two 8×8 chrominance blocks(1 U and 1 V). Macroblocks are the units for motion-compensated compression. Blocks are used for DCT compression. Frames can be encoded in three types: intra-frames (I-frames), forward predicted frames (P-frames), and bi-directional predicted frames (B-frames). An I-frame is encoded as a single image, with no reference to any past or future frames. The encoding scheme used is similar to JPEG compression. Each 8×8 block is encoded independently with one exception explained below future frames. The encoding scheme used is similar to JPEG compression. Each 8×8 block is encoded independently with one exception explained below. The block is first transformed from the spatial domain into a frequency domain using the DCT (Discrete Cosine Transform), which separates the signal into independent frequency bands. Most frequency information is in the upper left corner of the resulting 8×8 block. After this, the data is quantized. Quantization can be thought of as ignoring lower-order bits (though this process is slightly more complicated). Quantization is the only lossy part of the whole compression process other than subsampling. The resulting data is then run-length encoded in a zig-zag ordering to optimize compression. This zig-zag ordering produces longer runs of 0's by taking advantage of the fact that there should be little high-frequency information (more 0's as one zig-zags from the upper left corner towards the lower right corner of the 8×8 block). The aforementioned exception to independence is that the coefficient in the upper left corner of the block, called the DC coefficient, is encoded relative to the DC coefficient of the previous block (DCPM coding).

A P-frame is encoded relative to the past reference frame. A reference A P-frame is encoded relative to the past reference frame. A reference frame is a P- or I-frame. The past reference frame is the closest preceding reference frame. Each macroblock in a P-frame can be encoded either as an I-macroblock or as a P-macroblock. An I-macroblock is encoded just like a macroblock in an I-frame. A P-macroblock is encoded as a 16×16 area of the past reference frame, plus an error term. To specify the 16×16 area of the reference frame, a motion vector is included. A motion vector (0, 0) means that the 16×16 area is in the same position as the macroblock we are encoding. Other motion vectors are relative to that position. Motion vectors may include half-pixel values, in which case pixels are averaged. The error term is encoded using the DCT, quantization, and run-length encoding. A macroblock may also be skipped which is equivalent to a (0, 0) vector and an all-zero error term. The search for good motion vector (the one that gives small error term and good compression) is the heart of any MPEG-1 video encoder and it is the primary reason why encoders are slow. A B-frame is encoded relative to the past reference frame, the future reference frame, or both frames. The future reference frame is the closest A B-frame is encoded relative to the past reference frame, the future reference frame, or both frames. The future reference frame is the closest following reference frame (I or P). The encoding for B-frames is similar to P-frames, except that motion vectors may refer to areas in the future reference frames. For macroblocks that use both past and future reference frames, the two 16×16 areas are averaged. Typical MPEG-1 Encoding Pattern and Dependencies. A typical IPB sequence is shown in FIG. 1. The arrows represent the inter-frame dependencies. Frames do not need to follow a static IPB pattern. Each individual frame can be of any type. Often, however, a fixed IPB sequence is used throughout the entire video stream for simplicity. The typical data rate of an I-frame is 1 bit per pixel while that of a P-frame is 0.1 bit per pixel and for a B-frame, 0.015 bit per pixel. The order of the frames in the output sequence is rearranged in a way that an MPEG decoder can decompress the frames with minimum frame buffering (a maximum of 3 frame buffers). For example, an input sequence of IBBPBBP will be decoder can decompress the frames with minimum frame buffering (a maximum of 3 frame buffers). For example, an input sequence of IBBPBBP will be arranged in the output sequence as IPBBPBB.

Layered structure:

An MPEG-1 video sequence is an ordered stream of bits, with a special bit patterns marking the beginning and ending of a logical section. Each video sequence is composed of a series of Groups of Pictures (GOP's). A GOP is composed of a sequence of pictures (frames). A frame is composed of a series of slices. A slice is composed of a series of macroblocks, and a macroblock is composed of 6 or fewer blocks (4 for luminance and 2 for chrominance) and possibly a motion vector. The GOP structure is intended to assist random access into a sequence. A GOP is independently decodable unit that can be of any size as long as it begins with an I-frame. (There is one caveat here, SEQUENCES are a higher level structure than GOPs, and may contain information about quantization begins with an I-frame. (There is one caveat here, SEQUENCES are a higher level structure than GOPs, and may contain information about quantization tables. Their information is needed to decode all following GOPs.) GOPs are independently decodable if they are closed, for example a GOP with the pattern IBBP is closed, but the pattern IB is not. Each slice is (in a sense) an independently decodable unit too. There can be 1 slice per frame, 1 slice per macroblock, or anything in between. The slice structure is intended to allow decoding in the presence of errors. Serendipitously, it also allows parallel encoding/decoding at the slice level.

Those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A method for multiplexing a stored digital video file and a stored digital audio file, or a combined video/audio file, where the stored video and audio files are sampled, recorded and digitized at a first frame rate, FR1, but where the multiplexing assumes a second frame rate, FR2, and where said multiplexing preserves the video and audio synchronization, comprising the steps of:

storing said digital audio file with first control bits associated with said audio file which relate to a digitizing process having a value compliant with FR2, multiplying the value of said first control bits by FR2/FR1 forming second control bits, replacing said first control bits by said second control bits, notifying said multiplexing and where said audio control bits are located, multiplexing said stored digital video file and said stored digital audio file containing said second control bits.

2. The method of claim 1 wherein FR2 is evenly divisible by FR1.

3. The method of claim 1 wherein the video and audio are digitized into files and multiplexed together for playback under one of the MPEG standards.

4. The method of claim 3 wherein the MPEG standard is MPEG-1, and said first and second control bits comprise sampling rate and average bytes per second information.

5. The method of claim 1 wherein said FR1 is 15 or 7.5 frames per second, and said FR2 is 30 frames per second.

6. The method of claim 1 wherein said FR1 is 12 or 6 frames per second, and said FR2 is 24 frames per second.

7. A method for multiplexing a stored digital video file and a stored digital audio file, where the stored video and audio files are recorded and digitized at a first frame rate, FR1, but where the multiplexing assumes a second frame rate, FR2, and where said multiplexing preserves the video and audio synchronization, comprising the steps of:

storing said digital audio file at a first location where the actual data packets start, divide FR2/FR1 forming a first factor, N, forming a second stored digital audio file by taking every Nth packet of the first stored digital audio file, multiplexing said stored digital video file and said second stored digital audio file.

8. A method as in claim 7 wherein N equal 2 and every second packet is taken to form the second stored digital audio file.

9. The method of claim 7 wherein N equals 4 and every fourth packet is taken to form the second stored digital audio file.

10. Computer and associated apparatus for multiplexing a stored digital video file and a stored digital audio file, where the stored video and audio files are sampled, recorded and digitized at a first frame rate, FR1, but where the multiplexing assumes a second frame rate, FR2, and where said multiplexing preserves the video and audio synchronization, comprising:

means for storing said digital audio file with first control bits associated with said audio file which relate to a digitizing process having a value compliant with FR2, means for multiplying the value of said first control bits by FR2/FR1 forming second control bits, means for replacing said first control by said second control bits, means for notifying said multiplexing and where said audio control bits are located, and a multiplexer wherein said stored digital video file and said stored digital audio file containing said second control bits are combined producing a synchronized video/audio data stream.

11. Apparatus as in claim 10 further comprising means for formatting said audio and video files into MPEG-1 files, and said first and second control bits comprise sampling rate and average bytes per second information.

12. Computer and associated hardware and software for multiplexing a stored digital video file and a stored digital audio file, where the stored video and audio files are recorded and digitized at a first frame rate, FR1, but where the multiplexing assumes a second frame rate, FR2, and where said multiplexing preserves the video and audio synchronization, comprising:

means for storing said digital audio file at a first location where the actual data packets start,     means for dividing FR2/FR1 forming a first factor, N,     means for forming a second stored digital audio file by taking every Nth packet of the first stored digital audio file,     a multiplexer wherein said stored digital video file and said second stored digital audio file are combined.

13. Apparatus as in claim 12 further comprising means for formatting said audio and video files into MPEG-1 files, and N is a whole number.

* * * * *